United States Patent [19]
Shiraki et al.

[11] Patent Number: 5,270,444
[45] Date of Patent: Dec. 14, 1993

[54] PROCESS FOR TREATMENT OF POLYETHYLENE TEREPHTHALATE, POLYETHYLENE TEREPHTHALATE FOR MOLDING PURPOSES AND PROCESS FOR PREPARATION THEREOF

[75] Inventors: Shigemi Shiraki; Yasuhiro Tanaka; Masayuki Sakai, all of Kuga, Japan

[73] Assignee: Mitsui Petrochemical Industries, Ltd., Tokyo, Japan

[21] Appl. No.: 32,169

[22] Filed: Mar. 12, 1993

Related U.S. Application Data

[60] Continuation of Ser. No. 725,825, Jul. 3, 1991, abandoned, which is a division of Ser. No. 500,004, Mar. 27, 1990, abandoned.

[30] Foreign Application Priority Data

| Mar. 31, 1989 | [JP] | Japan | 1-83353 |
| Mar. 31, 1989 | [JP] | Japan | 1-83354 |
| Mar. 31, 1989 | [JP] | Japan | 1-83355 |
| Mar. 31, 1989 | [JP] | Japan | 1-83356 |
| Apr. 14, 1989 | [JP] | Japan | 1-94596 |
| Apr. 14, 1989 | [JP] | Japan | 1-94597 |
| May 31, 1989 | [JP] | Japan | 1-138179 |
| May 31, 1989 | [JP] | Japan | 1-138180 |

[51] Int. Cl.$^5$ .............................................. C08J 3/00
[52] U.S. Cl. ................................ 528/499; 528/308.2; 528/308.4; 528/308.5; 528/502; 528/503
[58] Field of Search ............... 528/308.2, 308.4, 308.5, 528/499, 502, 503

[56] References Cited

U.S. PATENT DOCUMENTS 4,591,629   5/1986   El-Ghatta et al. ............... 528/308.2

FOREIGN PATENT DOCUMENTS 55-13714   1/1980   Japan .

Primary Examiner—John Kight, III
Assistant Examiner—Sam A. Acquah
Attorney, Agent, or Firm—Sherman & Shalloway

[57] ABSTRACT

According to the present invention, a process which comprises bringing polyethylene terephthalate having an intrinsic viscosity of at least 0.50 dl/g and a density of 1.38 g/cm$^3$ or more into contact with water is provided.

In the water-treated polyethylene terephthalate obtained in the present invention, amounts of oligomers and acetaldehyde formed at the time of molding said polyethylene terephthalate into molded articles are small, and the contamination of the mold therewith is difficult to occur and further the contents of said molded articles does not change in flavor and fragrance.

4 Claims, 2 Drawing Sheets

PROCESS FOR TREATMENT OF POLYETHYLENE TEREPHTHALATE, POLYETHYLENE TEREPHTHALATE FOR MOLDING PURPOSES AND PROCESS FOR PREPARATION THEREOF

This application is a continuation of application Ser. No. 07/725,825, filed Jul. 3, 1991; which is a division of application Ser. No. 07/500,004, filed Mar. 27, 1990, both abandoned.

FIELD OF THE INVENTION

This invention relates to processes for treatment of polyethylene terephthalate used in molding therefrom bottles, sheets, films or the like molded articles, and more particularly to the processes for the treatment of polyethylene terephthalate to obtain such polyethylene terephthalate as may be useful for molding purposes, by the use of which the contamination of the mold therewith is difficult to occur.

In another aspect, the invention relates to polyethylene terephthalate used in molding therefrom bottles, sheets, films or the like molded articles, the more particularly to polyethylene terephthalate, by the use of which the contamination of the mold therewith is difficult to occur, and also to processes for preparing the same.

Further, the invention relates to polyethylene terephthalate used in molding therefrom bottles, sheets, films, or the like molded articles, by the use of which acetaldehyde is difficult to form.

BACKGROUND OF THE INVENTION

Various resins have heretofore been used as materials for containers of seasonings, oils, beverages, cosmetics and detergents according to the kind of contents with which the containers are filled and to the purpose which the containers are used.

Because of its excellent mechanical strength, heat resistance, transparency and gas barrier properties, polyethylene terephthalate is a useful material for forming containers to be filled particularly beverages such as fruit juices, cooling drinks and carbonated drinks.

Such polyethylene terephthalate as referred to above may, for example be prepared by esterifying terephthalic acid or its ester-forming derivative with ethylene glycol or its ester-forming derivative in the presence of an esterification catalyst, and polymerizing the esterified product in liquid phase in the presence of a polymerization catalyst, followed by solid phase polycondensation. In general, polyethylene terephthalate thus prepared is fed to a molding machine such as an injection molding machine and molded into a blow-molding preform, and thereafter the preform is inserted into a mold of a predetermined shape and stretch blow-molded into a blown container, and if necessary followed by heat setting.

However, known polyethylene terephthalate obtained by the conventional procedure as mentioned above contains oligomers such as cyclic trimer, with the result that the oligomers attach to the inner surface of blow-molding mold and contaminate the mold therewith or attach to the vent portion of mold of the injection machine as mentioned above and contaminate the mold therewith.

Such contamination of the mold as mentioned above forms the determining cause for surface roughness or chalking of the resulting bottle. If the bottle obtained is chalked, either partly or wholly, it has to be discarded. Owing to such circumstances, in molding bottles out of the known polyethylene terephthalate, there was such a serious problem that contaminants attached to the mold must be removed therefrom at frequent intervals and hence productivity of the bottle markedly decreases.

In light of such existing circumstances as mentioned above, the present inventors extensively studied with the view of obtaining polyethylene terephthalate, by the use of which the contamination of the mold therewith is difficult to occur, and have found that the contamination of the mold at the time of molding polyethylene terephthalate is mainly attributable to an increased amount of oligomers such as cyclic trimers contained in the polyethylene terephthalate, said oligomers being formed in large amounts at the time when said polyethylene terephthalate is molded.

The present inventors further studied on the basis of the above-mentioned finding, and eventually have found that the increase in amount of the oligomers in polyethylene terephthalate at the time of molding may be inhibited by bringing the polyethylene terephthalate into contact with water, and they have accomplished the present invention.

Furthermore, the present inventors have found that there is an intimate relationship between a rate of polycondensation at the time when polyethylene terephthalate used for molding is subjected under specific conditions to solid phase polycondensation treatment and an increasing amount of oligomers formed at the time of molding, and that if the rate of polycondensation treatment of the polyethylene terephalate is less than a specific value, the contamination of the mold at the time of molding is difficult to occur, on the basis of which finding the present invention has been accomplished.

In this connection, Japanese Patent L-O-P Publn. No. 25815/1984 discloses a process which comprises treating particulate polyethylene terephthalate, prior to solid phase polycondensation thereof, with water vapor heated to above 110° C. so as to crystallize the polyethylene terephthalate.

Further, Japanese Patent L-O-P Publn. No. 219328/1984 discloses a process for preparing polyesters of high polymerization degree, which comprises a step of moisture conditioning a polyester having ethylene terephthalate units as the main repeating units and having an intrinsic viscosity of at least 0.4 dl/g and a density of less than 1.35 g/cm$^3$ so as to have the moisture content of at least 0.2% by weight, a step of precrystallizing the polyester thus treated, and a step of solid phase polymerizing the precrystallized polyester at a temperature of above 180° C. and below 240° C. in an inert gas atmosphere or under reduced pressure.

OBJECT OF THE INVENTION

The present invention is intended to solve such problems associated with the prior art as mentioned above, and an object of the invention is to provide processes for treatment of polyethylene terephthalate to obtain such polyethylene terephthalate as may be useful for molding purposes, by the use of which an increasing amount of oligomers such as cyclic trimer formed at the time of molding is small and the contamination of mold therewith is difficult to occur.

A further object of the invention is to provide polyethylene terephthalate for molding purposes, by the use of which the amount of oligomers such as cyclic trimer formed at the time of molding is small and the contamination of mold therewith is difficult to occur, and processes for preparing the same.

SUMMARY OF THE INVENTION

The process for treatment of polyethylene terephthalate of the present invention is characterized by bringing polyethylene terephthalate into contact with water, said polyethylene terephthalate having an intrinsic viscosity of at least 0.50 dl/g and a density of more than 1.38 g/cm$^3$.

Such contact of polyethylene terephthalate with water may be effected, for example, by bringing the polyethylene terephthalate into contact with water at a temperature of from 1° C. to 150° C. for a period of 1 minute to 100 hours.

Furthermore, the contact of polyethylene terephthalate with water may be effected by bringing the polyethylene terephthalate into contact with water vapor or a water vapor containing gas at a temperature of from 1° to 150° C. for a period of 1 minute to 1 year.

The process for preparing polyethylene terephthalate of the invention, for example, is characterized by comprising an esterification step which comprises esterifying terephthalic acid or its ester-forming derivative with ethylene glycol or its ester-forming derivative, a liquid phase polycondensation step which comprises heating and melting the esterification product obtained in the above-mentioned esterification step in the presence of a polycondensation catalyst, a solid phase polycondensation step which comprises heating the polycondensation reaction product obtained in the above-mentioned liquid phase polycondensation step to a temperature below its melting point in an inert atmosphere, and a water treatment step which comprises bringing the polycondensation reaction product obtained in the above-mentioned solid phase polycondensation step into contact with water.

The first polyethylene terephthalate of the invention is characterized in that the polyethylene terephthalate has an intrinsic viscosity of at least 0.50 dl/g and a density of more than 1.38 g/cm$^3$, and that the rate of polycondensation employed at the time when said polyethylene terephthalate is subjected to the solid phase polycondensation treatment at a temperature of 215° C. in an inert atmosphere is less than 0.0055 dl/g·hr.

The second polyethylene terephthalate of the invention is characterized in that the polyethylene terephthalate has an intrinsic viscosity of at least 0.50 dl/g, a density of more than 1.38 g/cm$^3$ and the oligomer (the cyclic trimer) content of less than 0.50% by weight, and that the increased amount y (wt %) of the oligomer contained in the polyethylene terephthalate after said polyethylene terephthalate has been molded into a stepped square plate by melting at 290° C. is defined as $y \leq -0.20x + 0.2$ wherein y is an increased amount (wt %) of the oligomer after molding, and x is the oligomer concentration (wt %) prior to molding.

The third polyethylene terephthalate of the invention is characterized in that the polyethylene terephthalate has an intrinsic viscosity of at least 0.50 dl/g, a density of more than 1.38 g/cm$^3$, and that when a rate of polycondensation in the solid phase polycondensation treatment of the polyethylene terephthalate conducted by heating at a temperature of 215° C. in an inert atmosphere is taken as $V_0$, and when a rate of polycondensation in the solid phase polycondensation treatment conducted after bringing the polyethylene terephthalate into contact with hot water kept at 95° C. for 8 hours is taken as $V_1$, the $V_1/V_0$ ratio is defined as 0.2-1.0.

The fourth polyethylene terephthalate of the invention is characterized in that the polyethylene terephthalate has an intrinsic viscosity of at least 0.50 dl/g, a density of more than 1.38 g/cm$^3$ and the oligomer content of less than 0.5% by weight, and that when the oligomer content in a stepped square plate obtained by injection molding the polyethylene terephthalate, as it is, at a molding temperature of 290° C. is taken as $W_0$ (wt %), and when the oligomer content in a stepped square plate obtained by drying the polyethylene terephthalate after being immersed in hot water kept at 95° C. for 8 hours and injection molding the thus treated polyethylene terephthalate into the molded article is taken as $W_1$ (wt %), the remainder left by subtracting $W_1$ from $W_0$ is 0-0.12% by weight.

The fifth polyethylene terephthalate of the invention is characterized in that the polyethylene terephthalate has an intrinsic viscosity of at least 0.50 dl/g, a density of more than 1.38 g/cm$^3$ and that when the acetaldehyde content of an article obtained by injection molding the polyethylene terephthalate at a molding temperature of 290° C. is taken as $W_0$ (wt %) and, on one hand, when the acetaldehyde content of an article obtained by injection molding likewise the polyethylene terephthalate which has been immersed in hot water kept at 95° C. for 8 hours and dried is taken as $W_1$ (wt %), $W_0-W_1$ is 0-5 ppm by weight.

In the polyethylene terephthalates of the invention as illustrated above, amounts of oligomers and acetaldehyde formed at the time of molding said polyethylene terephthalates into molded articles are small, and accordingly the contamination of the mold therewith is difficult to occur, and further the contents of said molded article do not change in flavor or fragrance, since the acetaldehyde is difficult to form.

DETAILED DESCRIPTION OF THE INVENTION

Figure 1:
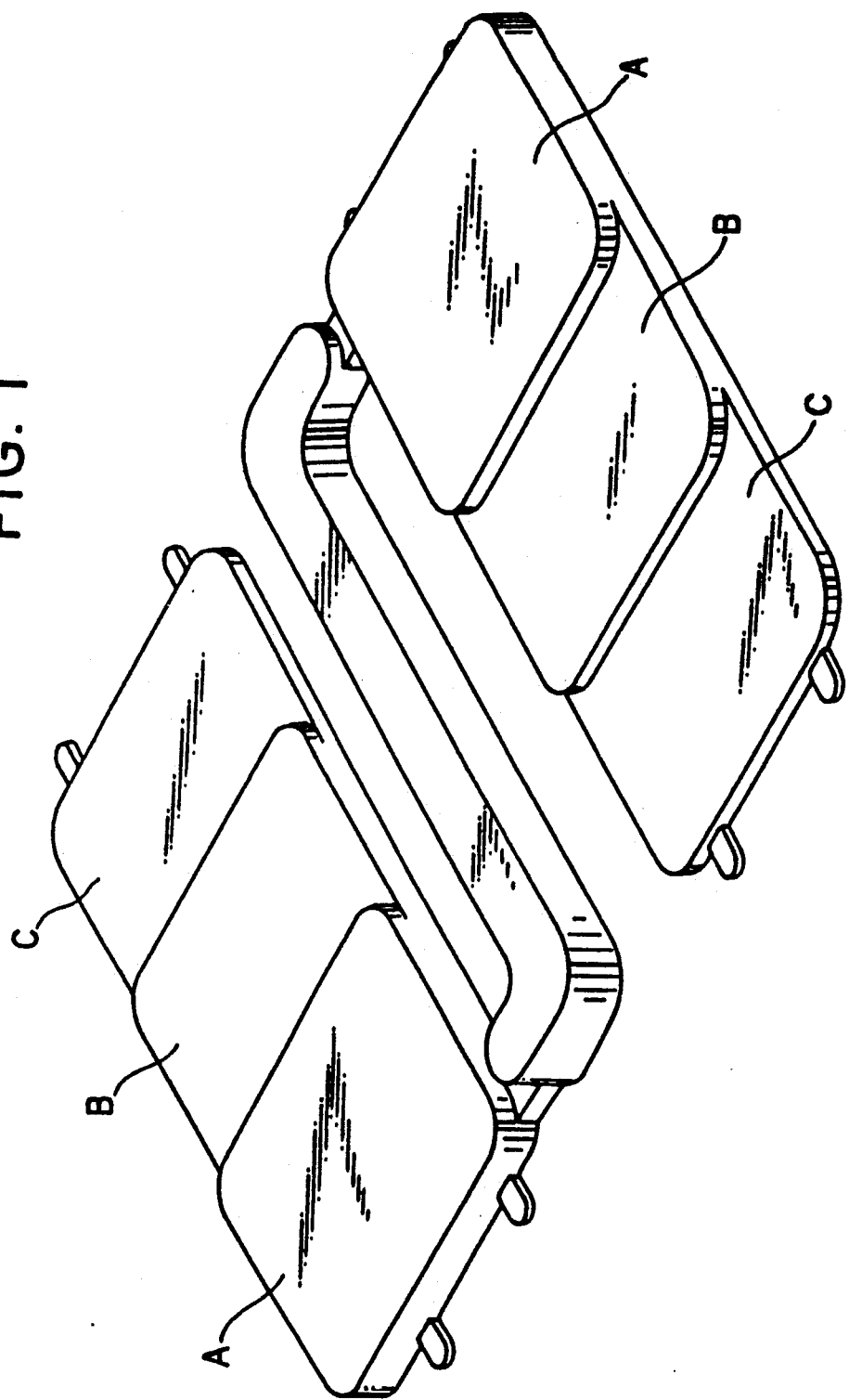
FIG. 1 is a slant view of a stepped square plate molded article.

Hereinafter, the process for treatment of polyethylene terephthalate, the process for preparing of polyethylene terephthalate, and the polyethylene terephthalates of the present invention are illustrated in detail.

The polyethylene terephthalate used in the process for treatment of polyethylene terephthalate of the invention preferably has specific intrinsic viscosity and density.

Such polyethylene terephthalate as used in the invention may be prepared from starting materials comprising of terephthalic acid or its ester-forming derivative and ethylene glycol or its ester-forming derivative, and this polyethylene terephthalate may also be copolycondensed with less than 20 mol % of other dicarboxylic acids and/or other glycols.

Dicarboxylic acids, other than terephthalic acid, which may be used in the copolycondensation mentioned above include, for example, aromatic dicarboxylic acids such as phthalic acid, isophthalic acid, naphthalenedicarboxylic acid, diphenyldicarboxylic acid and diphenoxyethanedicarboxylic acid, aliphatic dicarboxylic acids such as adipic acid, sebacic acid, azelaic acid and decanedicarboxylic acid, and alicyclic dicarboxylic acids such as cyclohexanedicarboxylic acid.

Glycols, other than ethylene glycol, which may be used in the above-mentioned copolycondensation include, for example, aliphatic glycols such as trimethylene glycol, propylene glycol, tetramethylene glycol, neopentyl glycol, hexamethylene glycol and dodecamethylene glycol; alicyclic glycols such as cyclohexane dimethanol; bisphenols; and aromatic diols such as hydroquinone and 2,2-bis(4-β-hydroxyethoxyphenyl)propane.

The starting materials containing terephthalic acid or its ester-forming derivative and ethylene glycol or its ester-forming derivative as mentioned above are esterified in the presence of an esterification catalyst, followed by liquid phase polycondensation in the presence of a polycondensation catalyst and then followed by solid phase polycondensation.

An example of preferred processes for the preparation of polyethylene terephthalate to be subjected to the water treatment in the present invention is illustrated below, but it should be construed that the invention is in no way limited to the process exemplified herein. In the exemplified process, first of all a slurry containing terephthalic acid or its ester-forming derivative and ethylene glycol or its ester-forming derivative is prepared.

The slurry as prepared above contains 1.02-1.4 moles, preferably 1.03-1.3 moles, based on 1 mole of terephthalic acid or its ester-forming derivative, of ethylene glycol or its ester-forming derivative. This slurry is fed continuously to an esterification reaction process.

The esterification reaction is carried out with an apparatus having at least two esterification reactors connected in series under the conditions where ethylene glycol is refluxed, while removing out of the system the water formed by the reaction by means of a rectification column. The reaction conditions under which the esterification reaction is carried out are such that the temperature of the first stage esterification reaction is usually 240°-270° C., preferably 245°-265° C., the pressure is usually 0.2-3 kg/cm$^2$ G, preferably 0.5-2 kg/cm$^2$ G, the temperature of the final stage esterification reaction is usually 250°-280° C., preferably 255°-275° C., and the pressure is usually 0-1.5 kg/cm$^2$ G, preferably 0-1.3 kg/cm$^2$ G.

Accordingly, when the esterification reaction is carried out in two stages, the esterification reaction conditions for the first and second esterification reactions are as defined above, and when said reaction is carried out in at least three stages, the esterification reaction conditions for the esterification reaction from the second stage to the stage prior to the final stage are intermediate between those of the first and final stage.

For instance, when the esterification reaction is carried out in three stages, the reaction temperature of the second stage esterification reaction is usually 245°-275° C., preferably 250°-270° C., and the pressure is usually 0-2 kg/cm$^2$ G, preferably 0.2-1.5 kg/cm$^2$ G. Although the rate of reaction to be attained in each stage of these esterification reactions, it is desirable that the increase and degree of the rate of reaction in each stage are smoothly distributed and the rate of reaction attained in the esterification reaction product of the final stage is usually at least 90%, preferably at least 93%.

By virtue of these esterification processes mentioned above, a lower condensate is obtained, and this lower condensate has usually a number average molecular weight of 500-5000.

The esterification reaction as illustrated above may be carried out without addition of additives other than terephthalic acid and ethylene glycol, and may also be carried out in the presence of polycondensation catalysts as will be mentioned later. Furthermore, it is preferable that the above-mentioned esterification reaction is carried out with a further addition thereto of small amounts of tertiary amines such as triethylamine, tri-n-butylamine and benzyldimethylamine; quaternary ammonium hydroxides such as tetraethylammonium hydroxide, tetra-n-butylammonium hydroxide and trimethylbenzylammonium hydroxide; and basic compounds such as lithium carbonate, sodium carbonate, potassium carbonate and sodium acetate, whereupon the proportion in the main chain of polyethylene terephthalate of the dioxyethylene terephthalate units can be maintained at a relatively low level.

Subsequently, the lower condensate thus obtained is fed to a liquid phase polycondensation process wherein this lower condensate is polycondensed under reduced pressure in the presence of a polycondensation catalyst while heating at a temperature of above a melting point of the resulting polyethylene terephthalate and removing out of the system the glycol formed at that time.

The liquid phase polycondensation reaction as referred to above may be carried out in a single stage or by dividing the process into plurality of stages. When the polycondensation reaction is carried out in a plurality of stages, the polycondensation reaction conditions employed are such that the reaction temperature of the first stage polycondensation is usually 250°-290° C., preferably 260°-280° C. and the pressure is usually 500-20 Torr, preferably 200-30 Torr, and the temperature of the final stage polycondensation reaction is usually 265°-300° C., preferably 270°-295° C. and the pressure is usually 10-0.1 Torr, preferably 5-0.5 Torr.

When the polycondensation reaction is carried out in two stages, the polycondensation reaction conditions for the first and second stage are as defined above, and when said reaction is carried out in at least three stages, the reaction conditions for polycondensation reactions from the second stage to the stage prior to the final stage are intermediate between those for the first and final stages.

For instance, when the polycondensation reaction is carried out in three stages, the reaction temperature of the second stage polycondensation reaction is usually 260°-295° C., preferably 270°-285° C. and the pressure is usually 50-2 Torr, preferably 40-5 Torr. Although an intrinsic viscosity (IV) of the polycondensate formed in each of these polycondensation reaction processes is not particularly limited, it is desirable that the degree of rise in intrinsic viscosity is smoothly distributed, and an intrinsic viscosity (IV) of polyethylene terephthalate obtained from the polycondensation reactor of the final stage is usually 0.35-0.80 dl/g, preferably 0.45-0.75 dl/g.

In the present specification, the intrinsic viscosity is determined by calculating a viscosity of a solution of polyethylene terephthalate as measured at 25° C., said solution being prepared by heating 1.2 g of polyethylene terephthalate to dissolve in 15 cc of o-chlorophenol, followed by cooling.

The polyethylene terephthalate thus obtained has a density of usually 1.33 g/cm³–1.35 g/cm³.

In the present specification, the density of polyethylene terephthalate is measured at a temperature of 23° C. by means of a density gradient tube.

The polycondensation reaction as illustrated above is desirably carried out in the presence of catalyst and stabilizers. The catalysts used may include germanium compounds such as germanium dioxide, germanium tetraethoxide and germanium tetra-n-butoxide, antimony catalysts such as antimony trioxide, and titanium catalysts such as titanium tetrabutoxide. Of these catalysts exemplified above, preferred is germanium dioxide, because the resulting polyethylene terephthalate is excellent in hue and transparency. The stabilizers used may include phosphoric acid esters such as trimethyl phosphate, triethyl phosphate, tri-n-butyl phosphate, trioctyl phosphate, triphenyl phosphate and tricresyl phosphate; phosphorous acid esters such as triphenyl phosphite, trisdodecyl phosphite and trisnonylphenyl phosphite; acid phosphate such as methyl acid phosphate, isopropyl acid phosphate, butyl acid phosphate, dibutyl acid phosphate and dioctyl phosphate; and phosphoric compounds such as phosphoric acid and polyphosphoric acid. The amount, based on the weight of the mixture of terephthalic acid and ethylene glycol, of the catalyst used is usually 0.0005–0.2% by weight, preferably 0.001–0.05% by weight in terms of the weight of the metal in the catalyst, and the amount of the stabilizer used is usually 0.001–0.05% by weight, preferably 0.002–0.02% by weight in terms of the weight of phosphorus atom in the stabilizer. These catalysts and stabilizers may be added at the stage of the esterification reaction process or may be fed to the reactor of the first stage polycondensation reaction process.

The polyethylene terephthalate used in the present invention may contain dicarboxylic acid other than terephthalic acid or diol other than ethylene glycol in an amount of less than 20 mol %, and particularly useful polyethylene terephthalate are those in which the content of ethylene terephthalate units (a) of the formula [I],

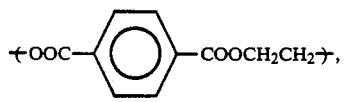

is 95.0–99.0 mol % and the content of dioxyethylene terephthalate units (b) of the formula [II]

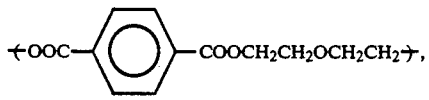

is 1.0–5.0 mol %.

The polyethylene terephthalate thus obtained from the final polycondensation reactor is usually molded into the form of granule (chip) by the melt extrusion molding method.

The particulate polyethylene terephthalate thus prepared desirably has an average diameter of usually 2.0–5.0 mm, preferably 2.2–4.0 mm.

This particulate polyethylene terephthalate is then fed to a solid phase polycondensation process.

The particulate polyethylene terephthalate may also be fed to the solid phase polycondensation process after having been pre-crystallized by heating up to a temperature lower than the temperature at which the solid phase polycondensation is carried out.

The pre-crystallization process mentioned above may be carried out by heating the particulate polyethylene terephthalate in a dried state at a temperature of usually 120°–200° C., preferably 130°–180° C. for a period of from 1 minute to 4 hours, or by heating the particulate polyethylene terephthalate in a water vapor atmosphere or a water vapor containing inert gas atmosphere at a temperature of usually 120°–200° C. for a period of at least 1 minute.

The solid phase polycondensation process to which the particulate polyethylene terephthalate is fed comprises at least one stage, and the solid phase polycondensation reaction is carried out in an atmosphere of inert gas such as nitrogen gas, argon gas or carbonic gas under the conditions such that the polycondensation temperature is usually 190°–230° C., preferably 195°–225° C., and the pressure is usually from 1 kg/cm² G to 10 Torr, preferably from normal pressure to 100 Torr. Of the inert gases mentioned above, preferred is nitrogen gas.

The polyethylene terephthalate thus obtained through the solid phase polycondensation process desirably has an intrinsic viscosity of usually at least 0.50 dl/g, preferably at least 0.54 dl/g.

This polyethylene terephthalate desirably has a density of usually 1.38 g/cm³ or more, preferably at least 1.39 g/cm³.

The amount of the oligomer, a cyclic trimer of the formula

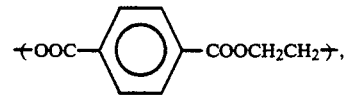

contained in the above-mentioned polyethylene terephthalate is less than 0.9% by weight, preferably less than 0.5% by weight, further preferably less than 0.45% by weight and especially less than 0.4% by weight.

In the present specification, the amount of oligomer contained in the polyethylene terephthalate is measured in the following manner.

That is, a predetermined amount of polyethylene terephthalate is dissolved in o-chlorophenol, separated again with tetrahydrofuran, and filtered to remove linear polyethylene terephthalate from the filtrate. Subsequently, the filtrate obtained is fed to a liquid chromatograph (LC 7 A, manufactured by Shimadzu Seisakusho Ltd.) to obtain the amount of oligomer contained in the polyethylene terephthalate, and the value of said amount of oligomer is divided by the amount of the polyethylene terephthalate used in the measurement and the result obtained is taken as the oligomer content (wt %).

In the present invention, the particulate polyethylene terephthalate thus obtained is subjected to water treatment, wherein this particulate polyethylene terephthalate is brought into contact with water, water vapor or water vapor-containing gas.

The contact of the particulate polyethylene terephthalate with water may be accomplished by immersing said polyethylene terephthalate in water kept at a temperature of from 1° C. to 150° C. for a period of from 1 minute to 100 hours or more, preferably from 5 minutes to 10 hours. Desirably, the particulate polyethylene terephthalate is immersed in hot water kept at 30°–150° C. for a period of from 1 minute to 10 hours. More desirably, the particulate polyethylene terephthalate is immersed in hot water kept at 40°–110° C. for a period of from 3 minutes to 5 hours. Most desirably, the particulate polyethylene terephthalate is immersed in hot water kept at 50°–100° C. for a period of from 5 minutes to 3 hours.

The contact of the particulate polyethylene terephthalate with water vapor or water vapor-containing gas may be accomplished by passing through said particulate polyethylene the water vapor, water vapor-containing gas or water vapor-containing air kept at a temperature of usually from 1° C. to 150° C., preferably 40°–150° C. and especially 50°–110° C. in an amount of at least 0.5 g in terms of water vapor per 1 kg of said particulate polyethylene terephthalate, thereby bringing the particulate polyethylene terephthalate into contact with the water vapor. The contact may also be accomplished in an atmosphere of water vapor or water vapor-containing gas.

The contact of the particulate polyethylene terephthalate with water vapor mentioned above is effected for a period of usually from 1 minute to 1 year, preferably from 5 minutes to 14 days.

The thus water-treated polyethylene terephthalate in the manner as illustrated above may be prepared by carrying out a series of steps which involve a step of esterifying terephthalic acid or its ester-forming derivative with ethylene glycol or its ester-forming derivative, a step of liquid phase polycondensing the esterification product obtained in the above-mentioned step by heating said product to melt in the presence of a polycondensation catalyst, a step of solid phase polycondensing the polycondensation reaction product obtained in the above-mentioned liquid phase polycondensation step in an inert atmosphere by heating said reaction product to a temperature below the melting point thereof, and a step of water-treating the polycondensation reaction product obtained in the above-mentioned solid phase polycondensation step by bringing said reaction product into contact with water.

By subjecting polyethylene terephthalate to water treatment in the manner mentioned above, not only the rate of solid phase polycondensation of said polyethylene terephthalate decreases but also an increase in amount of the oligomer formed in a stepped square plate molded out of said polyethylene terephthalate heated and melted at a temperature of 290° C. may be inhibited.

When such polyethylene terephthalate as treated with water, the rate of solid phase polycondensation of which has been decreased, is solid phase polycondensed by heating at a temperature of 215° C. in an inert gas atmosphere, the rate of polycondensation is less than 0.0055 dl/g·hr, preferably less than 0.005 dl/g·hr, further preferably less than 0.004 dl/g·hr and especially less than 0.003 dl/g·hr.

In the present specification, the rate of polycondensation of polyethylene terephthalate at the time when said polyethylene terephthalate is solid phase polycondensed is measured in the following manner.

A cylindrical stainless steel container of 22 mm in inside diameter and 80 mm in height is filled with 60 g of particulate polyethylene terephthalate, and then sealed. This container has at the bottom portion a nozzle for breathing inert gas, and is so designed that the inert gas is discharged out of the system through the upper portion thereof.

The solid phase polycondensation is carried out by passing nitrogen gas as the inert gas through the sealed stainless steel container packed with the particulate polyethylene terephthalate, said stainless steel container having been fitted to and held in a sand bath having a heating equipment (containing aluminum oxide, manufactured by Nippon Percalizino Co.)

The nitrogen gas used has a dew point of less than $-50°$ C. and an oxygen content of less than 20 ppm, and is preheated, prior to feeding to the stainless steel container, so as to have the same temperature as that of the bath. The nitrogen gas is fed to the stainless steel container at a rate of 200 Nl/hr.

The sand bath is brought by means of air to a fluid state so that the temperature of the bath becomes uniform and no temperature distribution occurs. The heater of the sand bath is so controlled that the bath temperature coincides with the predetermined solid phase polycondensation temperature by means of a program controller.

The rate of the solid phase polycondensation is determined by the following manner using the above-mentioned cylindrical stainless steel container and sand bath. The solid phase polycondensation reaction is carried out by fitting the sealed cylindrical stainless steel container filled with particulate polyethylene terephthalate to the sand bath, passing nitrogen gas at a rate of 200 N/hr through the container, elevating the temperature of the sand bath from room temperature up to 170° C. in 30 minutes, maintaining the elevated temperature at 170° C. for 1 hour, elevating said temperature from 170° C. up to 215° C. in 30 minutes and maintaining the elevated temperature at 215° C. for 4 hours.

After the completion of the solid phase polycondensation reaction, the heating is stopped, the temperature in the sand bath is lowered up to 70° C. while passing the nitrogen gas through the container, and the container is taken out from the sand bath to measure an intrinsic viscosity g/dl (IV) of the solid phase polycondensed particulate polyethylene terephthalate. This IV value as obtained is taken as A dl/g.

In the same manner as above, IV of the particulate polyethylene terephthalate is measured, except that the retention time at 215° C. is changed from 4 hours to 20 hours. This IV value as obtained is taken as B dl/g.

The rate of solid phase polycondensation is calculated from the following equation.

$$R = \frac{B - A}{16}$$

wherein R is a rate of solid phase polycondensation (dl/g·hr), and A and B individually represent IV value (dl/g) as measured after the retention time at 215° C. for 4 and 20 hours, respectively.

In the polyethylene terephthalate subjected to water treatment in the manner as mentioned above, an increase in amount of the oligomer formed in the course of the subsequent molding of said polyethylene terephthalate is markedly inhibited. This can be confirmed by measurement of the increased amount of the oligomer formed in a stepped square plate molded out of the water-treated polyethylene terephthalate heated to melt at a temperature of 290° C. The increased amount y (wt %) of the oligomer formed in the stepped square plate molded out of the water-treated polyethylene terephthalate of the present invention heated to melt at a temperature of 290° C. is usually $y \leq -0.20x+0.2$, preferably $y \leq -0.20x+0.18$ and further preferably $y \leq -0.20x+0.16$, wherein x is the oligomer concentration (wt %) in the polyethylene terephthalate prior to being molded into the stepped square plate.

In the present specification, the increased amount y (wt %) of the oligomer formed in the stepped square plate molded out of the particulate polyethylene terephthalate is measured in the following manner.

That is, 2 kg of the particulate polyethylene terephthalate, the oligomer content of which has previously measured (measured value %), is dried for at least 16 hours with a tray dryer at a temperature of 140° C. and a pressure of 10 Torr so that the moisture content of said polyethylene terephthalate becomes less than 50 ppm.

Subsequently, the dried particulate polyethylene terephthalate is fed to an injection molding machine (M-70A, manufactured by Meiki Seisakusho K.K.) and injection molded at a cylinder temperature of 290° C. and a temperature of water cooling mold of 15° C. to obtain a molded stepped square plate.

The injection molding of the molded stepped square plate is carried out by feeding the dried particulate polyethylene terephthalate from a hopper to the injection molding machine while adjusting the batch weighing to 12 seconds and the injection to 60 seconds. The reaction time of molten resin in the molding machine is adjusted to about 72 seconds. The molded stepped square plates each have a weight of 75 g, and the specimen for measuring the oligomer content is selected from among the molded plates obtained at the eleventh to fifteenth molding after the injection of injection molding.

The molded stepped square plate 1 has such a shape as shown in FIG. 1, and a thickness of portion A of said plate is about 6.5 mm, that of portion B is about 5 mm and that of portion C is about 4 mm. Using this portion C, the increased amount of the oligomer formed in the polyethylene terephthalate as molded into the stepped square plate is measured.

This molded plate having a thickness of 4 mm is then cut into chips which are then used as specimens for measuring the oligomer content.

The oligomer content in the polyethylene terephthalate constituting the stepped square plate is measured in the same manner as mentioned above.

In the polyethylene terephthalate treated with water as aforesaid, when the oligomer content in a molded article obtained by injection molding said polyethylene terephthalate at a molding temperature of 290° C. is taken as $W_0$ (wt %) and the oligomer content in a molded article obtained by immersing said polyethylene terephthalate in hot water kept at 95° C. for 8 hours followed by drying and then injection molding the dried polyethylene terephthalate is taken as $W_1$ (wt %), it is desirable that $W_0-W_1$ is 0-0.12% by weight, preferably 0-0.11% by weight and especially 0-0.10% by weight.

When a molded article is intended to obtain by using such polyethylene terephthalate as having the oligomer content of 0-0.12% by weight expressed in terms of $W_0-W_1$ as defined above, the oligomer is difficult to form in the resulting molded article and accordingly the contamination of the mold therewith can be effectively inhibited.

When the polyethylene terephthalate subjected to water treatment, the rate of solid phase polycondensation of which has been decreased as mentioned above, is solid phase polycondensed by heating at a temperature of 215° C. in an inert gas atmosphere, the rate of polycondensation as measured at that time is taken as $V_0$, and when said polyethylene terephthalate is immersed in hot water kept at 95° C. for 8 hours followed by drying and solid phase polycondensed in the same manner as above, the rate of solid phase polycondensation as measured at that time is taken as $V_1$, it is desirable that a ratio of polycondensation rate $V_1/V_0$ is 0.2-1.0, preferably 0.22-1.0 and especially 0.25-1.0.

When a molded article is intended to obtain by such polyethylene terephthalate as having the ratio of polycondensation ratio $V_1/V_0$ of 0.2-1.0, the oligomer is difficult to form in the resulting molded article and accordingly the contamination of the mold therewith can be effectively inhibited.

Furthermore, when the acetaldehyde content of an article obtained by injection molding the polyethylene terephthalate at a molding temperature of 290° C. is taken as $W_0$ (wt %) and, on one hand, when the acetaldehyde content of an article obtained by injection molding likewise the polyethylene terephthalate which has been immersed in hot water kept at 95° C. for 8 hours and dried is taken as $W_1$ (wt %), $W_0-W_1$ is 0-5 ppm by weight.

A molded article obtained from polyethylene terephthalate, in which the acetaldehyde content is measured, is prepared by drying particulate polyethylene terephthalate using a tray dryer for at least 16 hours at a temperature of 140° C. and a pressure of 10 Torr so that the moisture content of said particulate polyethylene terephthalate becomes less than 50 ppm, and then injection molding the dried particulate polyethylene terephthalate by using an injection molding machine (M-70A, manufactured by Meiki Seisakusho K.K.) at a cylinder temperature of 290° C. and a temperature of water cooling the mold of 15° C.

In an article molded out of such polyethylene terephthalate as having $W_0-W_1$ of 0-5 ppm as defined above, the acetaldehyde is difficult to form and accordingly the molded article does not emit foul odor or foreign odor, and the contents of said molded article do not change in flavor or fragrance.

In the present specification, the content of acetaldehyde contained in the polyethylene terephthalate is determined by cooling and pulverizing 2 g of a specimen, bringing the specimen back to room temperature, filling a container with 1 g of the specimen collected and 2 cc of an internal standard solution, and sealing the container. Thereafter, the acetaldehyde is extracted for 1 hour in an oven at 120° C., cooled with ice, and 5 μl of the supernatant is measured by GC-6A of Shimadzu Seisakusho K.K. to obtain the acetaldehyde content.

By subjecting polyethylene terephthalate to water treatment in the manner as mentioned hereinbefore, not only the rate of polycondensation of the polyethylene terephthalate decreases but also an increase in amount of oligomers such as the cyclic trimer or acetaldehyde contained in the polyethylene terephthalate at the time of molding thereof can be inhibited, and this is considered ascribable to the fact that by subjecting the polyethylene terephthalate to water treatment, a polycondensation catalyst, for example, germanium catalyst undergoes deactivation and accordingly a decomposition reaction or ester interchange reaction scarcely proceeds and, on that account, the amount of oligomers such as the cyclic trimer formed thereby becomes small.

As stated hereinbefore, the polyethylene terephthalate subjected to water treatment contains small amounts of oligomer formed at the time of molding said polyethylene terephthalate. Accordingly, when this polyethylene terephthalate is fed to a molding machine such as an injection molding machine and molded into a preform for blow molding, this preform is stretch blow molded by inserting it into a mold of a predetermined shape and then, if necessary, heat set to obtain a blow molded container, the contamination of the mold with oligomers such as the cyclic trimer is difficult to occur and further acetaldehyde is difficult to form.

EFFECT OF THE INVENTION

In the process for treatment of polyethylene terephthalate of the present invention, the polyethylene terephthalate having an intrinsic viscosity of at least 0.50 dl/g and a density of at least 1.37 g/cm$^3$ is treated with water by bringing said polyethylene terephthalate into contact with the water. In the polyethylene terephthalate subjected to the water treatment, only small amounts of oligomers such as cyclic trimer is formed at the time when said polyethylene terephthalate is molded and, moreover, because the total amount of oligomers such as the cyclic trimer contained in the polyethylene terephthalate at the time of molding thereof is small, the contamination of the mold therewith is difficult to occur.

Accordingly, when the polyethylene terephthalate treated with water in accordance with the present invention is molded into a molded article, there is no need for cleaning the mold frequently and thereby to improve productivity of molded articles such as bottle. The bottle molded out of the water-treated polyethylene terephthalate can be prevented from chalking and, moreover, practically little acetaldehyde is formed at the time of molding said polyethylene terephthalate.

The present invention is illustrated below with reference to examples, but it should be construed that the invention is in no way limited to those examples.

EXAMPLE 1

In a stainless steel container, 5 kg of particulate polyethylene terephthalate having an intrinsic viscosity of 0.80 dl/g, a density of 1.40 g/cm$^3$, the oligomer content of 0.31% by weight and an average particle diameter of 2.8 mm was immersed in 6.5 kg of distilled water.

Subsequently, the stainless steel container charged with the polyethylene terephthalate and distilled water was heated externally to control the temperature inside the container to 90° C. (the temperature inside the container was elevated to 90° C. in 10 minutes), and the water treatment of the polyethylene terephthalate was carried out for 4 hours while maintaining at that temperature, and the water-treated polyethylene terephthalate was dehydrated and dried in a nitrogen gas atmosphere at 140° C. for 14 hours.

The rate of polycondensation was 0.0026 dl/g·hr when the dried polyethylene terephthalate was subjected in the manner as already illustrated in the present specification to solid phase polycondensation treatment by heating at a temperature of 215° C. in a nitrogen gas atmosphere.

A stepped square plate molded out of the above-mentioned polyethylene terephthalate with an injection molding machine (M-70A of Meiki Seisakusho K.K.) at 290° C. according to the aforementioned procedure had the oligomer content of 0.35% by weight, thus an increased amount of the oligomer was 0.04% by weight.

EXAMPLE 2

In the same procedure as in Example 1, 5 kg of particulate polyethylene terephthalate having an intrinsic viscosity of 0.78 gl/g, a density of 1.40 g/cm$^3$, the oligomer content of 0.28% by weight and an average particle diameter of 2.6 mm was subjected to hot water treatment to measure a rate of solid phase polycondensation, whereby the rate of polycondensation as measured was 0.0016 dl/g·hr.

A molded article obtained by the same procedure as in Example 1 had the oligomer content of 0.29% by weight, thus an increased amount of the oligomer was 0.01% by weight.

EXAMPLE 3

A stainless steel container was charged 5 kg of the same polyethylene terephthalate as used in Example 1, and water vapor was passed therethrough at a rate of 0.5 kg/hr for 30 minutes.

A molded article obtained by the same procedure as in Example 1 had the oligomer content of 0.40% by weight, thus an increased amount of the oligomer was 0.09% by weight.

EXAMPLE 4

A pressure stainless steel container was charged with 5 kg of the same polyethylene terephthalate as used in Example 1, and water vapor having a pressure of 0.43 kg/cm$^2$ was passed therethrough at a rate of 0.5 kg/hr for 30 minutes.

The polyethylene terephthalate thus treated was dried in the same procedure as in Example 1 and measured for a rate of solid phase polycondensation, whereby the rate of polycondensation as measured was 0.0048 dl/g·hr.

A molded article obtained in the same procedure as in Example 1 had the oligomer content of 0.37% by weight, thus an increased amount of the oligomer was 0.06% by weight.

EXAMPLE 5

In a stainless steel container, 5 kg of the same polyethylene terephthalate as used in Example 1 was immersed in 6.5 kg of distilled water kept at 18° C.

After immersing for 30 minutes, the polyethylene terephthalate was dehydrated and dried in the same procedure as in Example 1, and the dried polyethylene terephthalate was then measured for rate of solid phase polycondensation, whereby the rate of polycondensation as measured was 0.0042 dl/g·hr.

A molded article obtained by the same procedure as in Example 1 had the oligomer content of 0.39% by weight, thus an increased amount of the oligomer was 0.08% by weight.

COMPARATIVE EXAMPLE 1

The same polyethylene terephthalate as used in Example 1 was dried in nitrogen gas at 140° C. for 14 hours, and the dried polyethylene terephthalate was subjected to solid phase polycondensation treatment by heating at a temperature of 215° C. in a nitrogen atmosphere to measure a rate of solid phase polycondensation, whereby the rate of polycondensation as measured was 0.0067 dl/g·hr.

An article molded out of the thus treated polyethylene terephthalate at 290° C. had the oligomer content of 0.50% by weight, thus an increased amount of the oligomer was 0.19% by weight.

COMPARATIVE EXAMPLE 2

The same polyethylene terephthalate as used in Example 2 was measured in the same procedure as in Comparative Example 1 for rate of solid phase polycondensation, whereby the rate of polycondensation as measured was 0.0057 dl/g·hr, and an article molded out of said polyethylene terephthalate had the oligomer content of 0.46% by weight, thus an increased amount of the oligomer was 0.18% by weight.

EXAMPLE 6

Using a continuous polycondensation apparatus comprising the 1st, 2nd, 3rd, 4th and 5th reactors which are of the tank type and the 6th reactor which is a biaxial rotary type horizontal reactor, continuous polymerization was carried out in the following manner to prepare polyethylene terephthalate.

A slurry prepared by mixing 1473 parts by weight of high purity terephthalic acid with 645 parts by weight of ethylene glycol was continuously fed per hour to the first reactor in which 3750 parts by weight of a reaction liquid had previously been retained with stirring at 255° C. and 1.7 kg/cm$^2$ G to carry out the first stage esterification reaction. In the first stage esterification reaction, a mixture of 203 parts by weight of water and 3 parts by weight of ethylene glycol was distilled off. The first stage esterification reaction product was so controlled that an average retention time becomes 2.0 hours, and the reaction product was introduced with stirring into the second reactor maintained at 260° C. and 0.8 kg/cm$^2$ G.

In the second reactor, a homogeneous mixture of 0.25 part by weight of germanium dioxide and 32 parts by weight of ethylene glycol per hour was continuously fed and, at the same time, a mixture of 84 parts by weight of water and 7 parts by weight of ethylene glycol per hour was continuously distilled off, and the second stage esterification reaction was continued. The second stage esterification reaction product was so controlled that an average retention time becomes 2.0 hours, and the reaction product was introduced with stirring to the third reactor maintained at 265° C. and normal pressure.

In the third reactor, homogeneous mixture of 1.23 parts by weight of trimethyl phosphate and 22 parts by weight of ethylene glycol per hour was continuously fed and, at the same time, a mixture of 21 parts by weight of water and 38 parts by weight of ethylene glycol per hour was continuously distilled off, and the third stage esterification reaction was continued.

The third esterification reaction product was also so controlled that an average retention time becomes 2.0 hours, and the reaction product was continuously introduced with stirring into the fourth reactor maintained at 275° C. and 70 mm Hg. In the fourth reactor, a mixture of 62 parts by weight of water and 6 parts by weight of ethylene glycol per hour was continuously distilled off, and the first stage polycondensation reaction was carried out. The first stage polycondensation reaction product was so controlled that an average retention time becomes 1.0 hour, and the reaction product was continuously introduced with stirring into the fifth reactor maintained at 280° C. and 5 mm Hg.

In the fifth reactor, a mixture of 26 parts by weight of water and 3 parts by weight of ethylene glycol per hour was continuously ditilled off, and the second stage polycondensation reaction was continued. The second stage polycondensation reaction product was so controlled that an average retention time becomes 1.0 hour, and the reaction product was continuously introduced into the sixth reactor which is a horizontal biaxial rotary reactor maintained at 282° C. and 1.8–2.5 mm Hg.

In the sixth reactor, a reaction mixture of 12 parts by weight of ethylene glycol and 1 part by weight of water per hour was continuously distilled off, and the third stage polycondensation reaction was continued. The third stage polycondensation reaction product was so controlled that an average retention time becomes 2.5 hours, and the reaction product was continuously withdrawn out of the reactor by means of a polyester-withdrawing equipment into the form of strand. The strand withdrawn was cooled by immersing in water and then cut up by means of a strand cutter into the form of chip. The polyethylene terephthalate obtained by the above-mentioned liquid phase polymerization had an intrinsic viscosity of 0.57 dl/g as measured in o-chlorophenol at 25° C. and the content of dioxyethylene terephthalate component of 2.50 mol %.

Further, the polyethylene terephthalate obtained by the above-mentioned liquid phase polymerization was dried and crystallized in a nitrogen atmosphere at about 140° C. for about 15 hours, and then fed to a column solid phase polymerizer to carry out solid phase polymerization in a nitrogen atmosphere at 205° C. for 15 hours. The polyethylene terephthalate thus obtained had an intrinsic viscosity of 0.80 dl/g as measured in o-chlorophenol at 25° C., a density of 1.40 g/cm$^3$, the oligomer content of 0.32% by weight and the content of dioxyethylene terephthalate component of 2.53 mol %.

In a stainless steel container, 5 kg of the polyethylene terephthalate (A) obtained above was immersed in 6.5 kg of distilled water.

Subsequently, the stainless steel container charged with the polyethylene terephthalate and distilled water was heated externally to control the temperature inside the container to 90° C., and maintained at that temperature for 4 hours to carry out water treatment. The water-treated polyethylene terephthalate was dehydrated and dried at 140° C. in a nitrogen atmosphere for 14 hours.

When the thus dried polyethylene terephthalate was subjected to solid phase polycondensation treatment in the manner illustrated already in the specification by heating at a temperature of 215° C. in a nitrogen gas atmosphere, the rate of polycondensation as measured was 0.0026 dl/g·hr.

An article molded out of the above-mentioned polyethylene terephthalate using an injection molding machine (M-70A manufactured by Meiki Seisakusho K.K.) at 290° C. had the oligomer content of 0.35% by weight, thus an increased amount of the oligomer was 0.04% by weight.

EXAMPLE 7

Example 6 was repeated except that the water treatment of polyethylene terephthalate was conducted by passing 0.5 kg/hr of water vapor through the stainless steel container filled with 5 kg of the polyethylene terephthalate (A).

In the same procedure as in Example 6, the polyethylene terephthalate thus treated was dried and then subjected to solid phase polycondensation treatment to measure a rate of solid phase polycondensation, whereby the rate of polycondensation as measured was 0.0052 dl/g·hr.

An article molded by the same manner as in Example 6 had the oligomer content of 0.40% by weight, thus on increased amount of the oligomer was 0.09% by weight.

EXAMPLE 8

Example 6 was repeated except that the water treatment of polyethylene terephthalate was conducted by charging a pressure stainless steel container with 5 kg of the polyethylene terephthalate (A) and passing therethrough water vapor (saturation temperature 110° C.) of 0.43 kg/cm² at a rate of 0.5 kg/hr for 30 minutes.

In the same procedure as in Example 6, the polyethylene terephthalate thus treated was dried and then subjected to solid phase polycondensation treatment to measure a rate of solid phase polycondensation, whereby the rate of polycondensation as measured was 0.0048 dl/g·hr.

An article molded by the same manner as in Example 6 had the oligomer content of 0.37% by weight, thus an increased amount of the oligomer was 0.06% by weight.

EXAMPLE 9

Example 6 was repeated except that the water treatment was conducted by immersing the polyethylene terephthalate (A) for 30 minutes in distilled water kept at 18° C.

In the same procedure as in Example 6, the polyethylene terephthalate thus treated was dried and then subjected to solid phase polycondensation treatment to measure a rate of solid phase polycondensation, whereby the rate of polycondensation as measured was 0.0042 dl/g·hr.

An article molded by the same manner as in Example 6 had the oligomer content of 0.39% by weight, thus an increased amount of the oligomer was 0.08% by weight.

COMPARATIVE EXAMPLE 3

The polyethylene terephthalate obtained in Example 6 without subjecting to hot water treatment was dried in a nitrogen gas at 140° C. for 14 hours, and then subjected to solid phase polycondensation treatment by heating in a nitrogen atmosphere at 215° C. to measure a rate of solid phase polycondensation, whereby the rate of polycondensation as measured was 0.0067 dl/g·hr.

An article molded out of this polyethylene terephthalate at 290° C. had the oligomer content of 0.50% by weight, thus an increased amount of the oligomer was 0.19% by weight.

EXAMPLE 10

In a stainless steel container, 5 kg of polyethylene terephthalate having an intrinsic viscosity of 0.80 dl/g, a density of 1.40 g/cm³ and the oligomer content of 0.33% by weight was immersed in 6.5 kg of distilled water.

Subsequently, the stainless steel container charged with the polyethylene terephthalate and distilled water was heated externally to control the temperature inside the container to 95° C., and maintained at that temperature for 4 hours to carry out hot water treatment. The polyethylene terephthalate thus treated was dehydrated and then dried at 140° C. in a nitrogen gas atmosphere for 14 hours.

When the thus dried polyethylene terephthalate was subjected to solid phase polycondensation treatment in the manner illustrated already in the specification by heating at 215° C. in a nitrogen gas atmosphere, the rate of polycondensation as measured was 0.0026 dl/g·hr.

A stepped square plate molded at 290° C. out of the above-mentioned polyethylene terephthalate using an injection molding machine (M-70A of Meiki Seisakusho K.K.) had the oligomer content of 0.35% by weight and the acetaldehyde content of 7.6 ppm.

EXAMPLE 11

In the same procedure as in Example 10, 5 kg of polyethylene terephthalate having an intrinsic viscosity of 0.78 dl/g, a density of 1.40 g/cm³ and the oligomer content of 0.28% by weight was subjected to hot water treatment to measure a rate of solid phase polycondensation, whereby the rate of polycondensation as measured was 0.0016 dl/g·hr.

A molded article obtained by the same procedure as in Example 10 had the oligomer content of 0.29% by weight and the acetaldehyde content of 7.5 ppm.

EXAMPLE 12

A stainless steel container was charged with 5 kg of the same polyethylene terephthalate as used in Example 10, and water vapor was passed therethrough at a rate of 0.5 kg/hr for 30 minutes.

The polyethylene terephthalate thus treated was dried and measured for a rate of solid phase polycondensation in the same manner as in Example 10, whereby the rate of polycondensation as measured was 0.0052 dl/g·hr.

A molded article obtained by the same procedure as in Example 10 had the oligomer content of 0.40% by weight.

COMPARATIVE EXAMPLE 4

The polyethylene terephthalate used in Example 10 was dried at 140° C. in a nitrogen gas atmosphere for 14 hours, and then subjected to solid phase polycondensation treatment by heating at a temperature of 215° C. in a nitrogen atmosphere to measure a rate of solid phase polycondensation, whereby the rate of polycondensation as measured was 0.0067 dl/g·hr.

An article molded at 290° C. out of the above-mentioned polyethylene terephthalate had the oligomer content of 0.51% by weight and the acetaldehyde content of 15 ppm.

COMPARATIVE EXAMPLE 5

The polyethylene terephthalate used in Example 11 was measured for a rate of solid phase polycondensation in the same procedure as in Comparative Example 4, whereby the rate of polycondensation as measured was 0.0057 dl/g·hr.

An article molded at 290° C. out of the above-mentioned polyethylene terephthalate had the oligomer content of 0.46% by weight and the acetaldehyde content of 14.2 ppm.

EXAMPLE 13

In a stainless steel container, 5 kg of particulate polyethylene terephthalate having an intrinsic viscosity of 0.80 dl/g, a density of 1.40 g/cm³ and the oligomer content of 0.33% by weight was immersed in 6.5 kg of distilled water.

Subsequently, the stainless steel container charged with the polyethylene terephthalate and distilled water was heated externally to control the temperature inside the container to 90° C., and maintained at that temperature for 4 hours to carry out hot water treatment. The thus treated polyethylene terephthalate was then dehydrated and dried to obtain the particulate polyethlene terephthalate of the present invention.

Using a tray dryer, 2 kg of the particulate polyethylene terephthalate thus obtained was dried for at least 16 hours at a temperature of 140° C. and a pressure of 10 Torr to reduce the moisture content of said particulate polyethylene terephthalate to less than 50 ppm.

The dried particulate polyethylene terephthalate was injection molded into a stepped square plate having a thickness of 4 mm using an injection molding machine (M-70A of Meiki Seisakusho K.K.) at a cylinder temperature of 290° C. and a temperature of water cooling the mold of 15° C.

The stepped square plate having a thickness of 4 mm was then cut into chips which were used as specimen for measuring the oligomer content of the plate. This stepped square plate has the oligomer content of 0.35% by weight, thus an increased amount of the oligomer was 0.02% by weight.

EXAMPLE 14

In the same procedure as in Example 13, 5 kg of polyethylene terephthalate having an intrinsic viscosity of 0.78 dl/g, a density of 1.40 g/cm$^3$ and the oligomer content of 0.28% by weight was subjected to hot water treatment, and then molded into a stepped square plate. The oligomer content of this stepped square plate as measured was 0.29% by weight, thus an increased amount of the oligomer was 0.01% by weight.

EXAMPLE 15

A stainless steel container was charged with 5 kg of the polyethylene terephthalate used in Example 13, and water vapor was passed therethrough for 30 minutes at a rate of 0.5 kg/hr.

In the same procedure as in Example 13, the thus treated polyethylene terephthalate was dried and then molded into a stepped square plate to measure the oligomer content of the stepped square plate, whereby the oligomer content was 0.40% by weight, thus an increased amount of the oligomer was 0.07% by weight.

COMPARATIVE EXAMPLE 6

The polyethylene terephthalate used in Example 13 was dried in a nitrogen gas at 140° C. for 14 hours, and then molded, as it was, into a stepped square plate in the same procedure as in Example 13 to measure the amount of oligomer contained in this plate, whereby the oligomer content was 0.51% by weight, thus an increased amount of the oligomer was 0.18% by weight.

COMPARATIVE EXAMPLE 7

The polyethylene terephthalate used in Example 14 was molded into a stepped square plate in the same procedure as in Comparative Example 6 to measure the amount of oligomer contained in this plate, whereby the oligomer content as measured was 0.46% by weight, thus an increased amount of the oligomer was 0.18% by weight.

Figure 2:
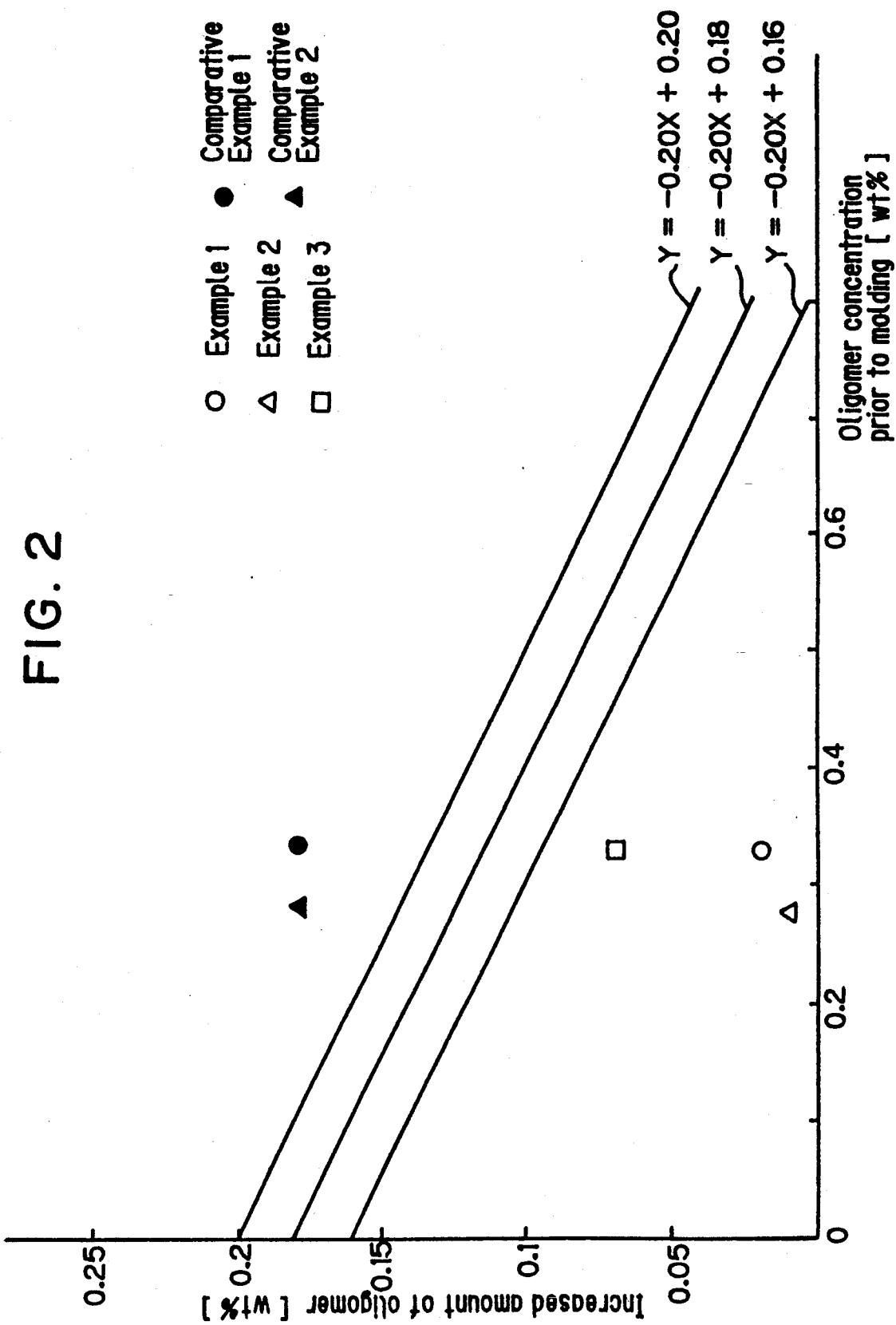
FIG. 2 is a graph showing the relationship between the amount of oligomer contained in particulate polyethylene terephthalate prior to molding thereof and the oligomer concentration in a stepped square plate molded therefrom.

Results obtained in Examples and Comparative Examples were shown in FIG. 2 wherein the abscissa indicates oligomer concentration (wt %) in the chips prior to molding, and the ordinate indicates an increased amount of the oligomer contained in the stepped square plate as molded.

EXAMPLE 16

In a stainless steel container, 5 kg of particulate polyethylene terephthalate having an intrinsic viscosity of 0.80 dl/g, a density of 1.40 g/cm$^3$ and the oligomer content of 0.33% by weight was immersed in 6.5 kg of distilled water. The stainless steel container charged with the polyethylene terephthalate and distilled water was heated externally to control the temperature inside the container, and maintained at that temperature to carry out hot water treatment. The polyethylene terephthalate thus treated was dehydrated and dried to obtain the polyethylene terephthalate of the present invention.

In a square plate obtained by injection molding the dried particulate polyethylene terephthalate at a cylinder temperature of 290° C., the oligomer content as measured was 0.35% by weight, and the acetaldehyde concentration was 7.6 ppm.

When the water-treated and dried particulate polyethylene terephthalate was subjected to solid phase polycondensation treatment by heating at a temperature of 215° C. in a nitrogen gas atmosphere in the manner as already illustrated in the present specification, the rate of polycondensation was 0.0026 dl/g·hr. This rate of polycondensation is taken as $V_0$.

Subsequently, this water-treated and dried particulate polyethylene terephthalate was further subjected to hot water treatment for 8 hours at a temperature of 95° C. inside the stainless steel container, dehydrated and dried to measure a rate of solid phase polycondensation, whereby the rate of polycondensation was 0.0012 dl/g·hr.

When this rate of solid phase condensation was taken as $V_1$, $V_1/V_0$ was 0.46.

EXAMPLE 17

Example 16 was repeated except that particulate polyethylene terephthalate having an intrinsic viscosity of 0.78 dl/g, a density of 1.40 g/cm$^3$ and the oligomer content of 0.28% by weight was used.

Results obtained are shown in Table 1.

The acetaldehyde concentration as measured in Example 17 was 7.5 ppm.

EXAMPLE 18

A stainless steel container was charged with 5 kg of particulate polyethylene terephthalate having an intrinsic viscosity of 0.80 dl/g, a density of 1.40 g/cm$^3$ and the oligomer content of 0.33% by weight, and water vapor was passed therethrough for 0.5 hour at a rate of 0.5 kg/hr.

Example 16 was then repeated except that the polyethylene terephthalate obtained above was used.

Results obtained are shown in Table 1.

EXAMPLE 19

Example 18 was repeated except that the water vapor was passed for 4 hours instead of 0.5 hour.

Results obtained are shown in Table 1.

EXAMPLE 20

Example 18 was repeated except that the water vapor was passed for 2 hours instead of 0.5 hour.
Results obtained are shown in Table 1.

EXAMPLE 21

Example 16 was repeated except that particulate polyethylene terephthalate having an intrinsic viscosity of 0.80 dl/g, a density of 1.40 g/cm$^3$ and the oligomer content of 0.33% by weight was subjected to hot water treatment in the stainless steel container by controlling the temperature inside the container to 95° C. and holding the polyethylene terephthalate therein for 16 hours, dehydrated and dried to obtain the polyethylene terephthalate of the present invention.
Results obtained are shown in Table 1.

EXAMPLE 22

Example 16 was repeated except that the hot water treatment time employed was 0.5 hour instead of 4 hours.
Other results obtained are shown in Table 1.

EXAMPLE 23

Example 16 was repeated except that particulate polyethylene terephthalate having an intrinsic viscosity of 0.80 dl/g, a density of 1.40 g/cm$^3$ and the oligomer content of 0.29% by weight was used instead.
Other results obtained are shown in Table 1.

EXAMPLE 24

Example 16 was repeated except that particulate polyethylene terephthalate having an intrinsic viscosity of 0.82 dl/g, a density of 1.40 g/cm$^3$ and the oligomer content of 0.29% by weight was used instead.
Results obtained are shown in Table 1.

COMPARATIVE EXAMPLE 8

The particulate polyethylene terephthalate used in Example 16, which had not been subjected to water treatment, was dried and injection molded at a cylinder temperature of 290° C. into a square plate. On determination, the square plate had the oligomer content of 0.51% by weight and the acetaldehyde concentration of 15 ppm.
When the particulate polyethylene terephthalate was subjected to solid phase polycondensation treatment by heating at a temperature of 215° C. in a nitrogen atmosphere, the rate of polycondensation as determined was 0.0067 dl/g·hr. This rate of solid phase polycondensation is taken as $V_0$.

Subsequently, when this particulate polyethylene terephthalate was subjected at the temperature inside a stainless steel container for 8 hours to hot water treatment, dehydrated and dried to measure a rate of solid phase polycondensation, the rate of polycondensation as determined was 0.0011 dl/g·hr. When this rate of solid phase polycondensation is taken as $V_1$, $V_1/V_0$ was 0.16.

COMPARATIVE EXAMPLE 9

Comparative Example 8 was repeated except that particulate polyethylene terephthalate having an intrinsic viscosity of 0.78 dl/g, a density of 1.40 g/cm$^3$ and the oligomer content of 0.28% by weight was used instead.
Results obtained are shown in Table 1.
The square plate has the oligomer content of 14 ppm.

COMPARATIVE EXAMPLE 10

Comparative Example 8 was repeated except that particulate polyethylene terephthalate having an intrinsic viscosity of 0.80 dl/g, a density of 1.40 g/cm$^3$ and the oligomer content of 0.29% by weight was used instead.
Other results obtained are shown in Table 1.

COMPARATIVE EXAMPLE 11

Comparative Example 8 was repeated except that particulate polyethylene terephthalate having an intrinsic viscosity of 0.82 dl/g, a density of 1.40 g/cm$^3$ and the oligomer content of 0.39% by weight was used instead.
Results obtained are shown in Table 1.
The acetaldehyde concentration of the square plate was 14 ppm.

TABLE 1

| | Rate of solid phase polycondensation $V_0$ | Rate of solid phase polycondensation $V_1$ | $V_1/V_0$ |
|---|---|---|---|
| Example 16 | 0.0026 | 0.0012 | 0.46 |
| Example 17 | 0.0016 | 0.00095 | 0.59 |
| Example 18 | 0.0052 | 0.0014 | 0.23 |
| Example 19 | 0.0038 | 0.0012 | 0.32 |
| Example 20 | 0.0046 | 0.0014 | 0.30 |
| Example 21 | 0.0013 | 0.0011 | 0.85 |
| Example 22 | 0.0033 | 0.0012 | 0.36 |
| Example 23 | 0.0020 | 0.0012 | 0.60 |
| Example 24 | 0.0032 | 0.0014 | 0.44 |
| Comparative Example 8 | 0.0067 | 0.0011 | 0.16 |
| Comparative Example 9 | 0.0057 | 0.00085 | 0.15 |
| Comparative Example 10 | 0.0078 | 0.0013 | 0.17 |
| Comparative Example 11 | 0.0069 | 0.0012 | 0.17 |

EXAMPLE 25

In a stainless steel container, 5 kg of particulate polyethylene terephthalate having an intrinsic viscosity of 0.80 dl/g, a density of 1.40 g/cm$^3$ and the oligomer content of 0.33% by weight was immersed in 6.5 kg of distilled water. Subsequently the stainless steel container charged with the polyethylene terephthalate and distilled water was heated externally to control the temperature inside the container and maintained at that temperature for 4 hours to carry out hot water treatment. The polyethylene terephthalate thus treated was dehydrated and dried to obtain the polyethylene terephthalate of the present invention.

A square plate obtained by injection molding this dried particulate polyethylene terephthalate at a cylinder temperature was measured for the amount of oligomer contained therein, whereby the oligomer content as determined was 0.35% by weight, and the acetaldehyde concentration of this square plate was 7.6 ppm. This oligomer content is taken as $W_0$.

Subsequently, the dried particulate polyethylene terephthalate was further subjected to hot water treatment at a temperature inside the stainless steel container of 95° C. for 8 hours, dehydrated and then dried. The oligomer content of a square plate obtained by injection molding at a cylinder temperature of 290° C. the particulate polyethylene terephthalate thus treated was 0.34% by weight. When this oligomer content was taken as $W_1$, $W_0-W_1$ was 0.01% by weight.

EXAMPLE 26

Example 25 was repeated except that particulate polyethylene terephthalate having an intrinsic viscosity of 0.78 dl/g, a density of 1.40 g/cm$^3$ and the oligomer content of 0.28% by weight was used instead.

Results obtained are shown in Table 2.

EXAMPLE 27

A stainless steel container was charged with 5 kg of particulate polyethylene terephthalate having an intrinsic viscosity of 0.80 dl/g, a density of 1.40 g/cm$^3$ and the oligomer content of 0.33% by weight, and water vapor kept at 100° C. was passed therethrough at a rate of 0.5 kg/hr for 0.5 hour.

Thereafter, Example 25 was repeated except that the particulate polyethylene terephthalate thus treated was used instead.

Results obtained are shown in Table 2.

EXAMPLE 28

Example 27 was repeated except that the water vapor was passed through the stainless steel container charged with the particulate polyethylene terephthalate for 4 hours instead of 0.5 hour.

Results obtained are shown in Table 2.

EXAMPLE 29

Example 27 was repeated except that the water vapor was passed through the stainless steel container charged with the particulate polyethylene terephthalate for 2 hours instead of 0.5 hour.

Results obtained are shown in Table 2.

EXAMPLE 30

Example 25 was repeated except that in the stainless steel container, particulate polyethylene terephthalate having an intrinsic viscosity of 0.80 dl/g, a density of 1.40 g/cm$^3$ and the oligomer content of 0.33% by weight was subjected to hot water treatment by controlling the temperature of water inside the container to 95° C. and maintaining the water at that temperature for 16 hours, and the particulate polyethylene terephthalate thus treated was dehydrated and dried to obtain the polyethylene terephthalate of the present invention.

Results obtained are shown in Table 2.

EXAMPLE 31

Example 25 was repeated except that the hot water treatment time employed was 0.5 hour instead of 4 hours. In this example, the acetaldehyde concentration of the square plate was 7.9 ppm.

Other results obtained are shown in Table 2.

EXAMPLE 32

Example 25 was repeated except that the particulate polyethylene terephthalate having an intrinsic viscosity of 0.80 dl/g, a density of 1.40 g/cm$^3$ and the oligomer content of 0.29% by weight was used instead. In this example, the acetaldehyde concentration of the square plate was 3.3 ppm.

Other results obtained are shown in Table 2.

EXAMPLE 33

Example 25 was repeated except that particulate polyethylene terephthalate having an intrinsic viscosity of 0.82 dl/g, a density of 1.40 g/cm$^3$ and the oligomer content of 0.39% by weight was used instead.

Results obtained are shown in Table 2.

COMPARATIVE EXAMPLE 12

The particulate polyethylene terephthalate used in Example 25, which had not been subjected to water treatment, was dried and injection molded at a cylinder temperature of 290° C. into a square plate. On determination, the square plate had the oligomer content of 0.51% by weight. This oligomer content is taken as $W_0$.

The acetaldehyde concentration of this square plate was 15 ppm.

Subsequently, when a square plate was obtained by injection molding at a cylinder temperature of 290° C. the above-mentioned particulate polyethylene terephthalate which had been subjected to hot water treatment in a stainless steel container at a temperature of water inside the container controlled to 95° C. for 8 hours, dehydrated and dried, the oligomer content of the square plate was 0.35% by weight. When this oligomer content was taken as $W_1$, $W_0-W_1$ was 0.16% by weight.

COMPARATIVE EXAMPLE 13

Comparative Example 12 was repeated except that particulate polyethylene terephthalate having an intrinsic viscosity of 0.78 dl/g, a density of 1.40 g/cm$^3$ and the oligomer content of 0.28% by weight was used instead.

Results obtained are shown in Table 2.

COMPARATIVE EXAMPLE 14

Comparative Example 12 was repeated except that particulate polyethylene terephthalate having an intrinsic viscosity of 0.80 dl/g, a density of 1.40 g/cm$^3$ and the oligomer content of 0.29% by weight was used instead. In this example, the acetaldehyde concentration of the square plate was 14 ppm.

Other results obtained are shown in Table 2.

COMPARATIVE EXAMPLE 15

Comparative Example 12 was repeated except that particulate polyethylene terephthalate having an intrinsic viscosity of 0.82 dl/g, a density of 1.40 g/cm$^3$ and the oligomer content of 0.39% by weight was used instead.

Results obtained are shown in Table 2.

EXAMPLE 34

Example 25 was repeated except that particulate polyethylene terephthalate having an intrinsic viscosity of 0.79 dl/g, a density of 1.40 g/cm$^3$ and the oligomer content of 0.29% by weight was used and the particulate was kept in an atmosphere of 90% relative humidity at a temperature of 40° C. for 7 days.

TABLE 2

| | Oligomer content of starting material $W_0$ (wt %) | Oligomer content of starting material after hot water treatment $W_1$ (wt %) | $W_0/W_1$ (wt %) |
|---|---|---|---|
| Example 25 | 0.35 | 0.34 | 0.01 |
| Example 26 | 0.29 | 0.28 | 0.01 |
| Example 27 | 0.40 | 0.34 | 0.06 |
| Example 28 | 0.37 | 0.34 | 0.03 |
| Example 29 | 0.40 | 0.33 | 0.07 |
| Example 30 | 0.34 | 0.33 | 0.01 |
| Example 31 | 0.37 | 0.34 | 0.03 |

TABLE 2-continued

| | Oligomer content of starting material $W_0$ (wt %) | Oligomer content of starting material after hot water treatment $W_1$ (wt %) | $W_0$-$W_1$ (wt %) |
|---|---|---|---|
| Example 32 | 0.34 | 0.32 | 0.02 |
| Example 33 | 0.41 | 0.39 | 0.02 |
| Comparative Example 12 | 0.51 | 0.35 | 0.16 |
| Comparative Example 13 | 0.46 | 0.29 | 0.17 |
| Comparative Example 14 | 0.49 | 0.33 | 0.16 |
| Comparative Example 15 | 0.53 | 0.40 | 0.14 |
| Example 34 | 0.31 | 0.29 | 0.02 |

EXAMPLE 35

In a stainless steel container, 5 kg of particulate polyethylene terephthalate having an intrinsic viscosity of 0.80 dl/g, a density of 1.40 g/cm$^3$ and the acetaldehyde content of 0.8 ppm was immersed in 6.5 kg of distilled water. The stainless steel container charged with the polyethylene terephthalate and distilled water was heated externally, the temperature inside the container was controlled to 95° C. and the container was maintained at this state for 4 hours to carry out hot water treatment of said polyethylene terephthalate. The polyethylene terephthalate thus treated was dehydrated and dried to obtain the polyethylene terephthalate of the present invention.

The polyethylene terephthalate thus treated was dried and then molded at a cylinder temperature of 290° C. into a square plate. The acetaldehyde content of the square plate was 7.2 ppm. This value is taken as $W_0$.

Subsequently, this particulate polyethylene terephthalate was subjected at the temperature of 95° C. for 8 hours to hot water treatment, dehydrated and dried, and then molded at a cylinder temperature of 290° C. into a square plate. The acetaldehyde content of the square plate was 6.0 ppm. This value is taken as $W_1$.

$W_0$-$W_1$ was 1.2 ppm.

EXAMPLE 36

Example 35 was repeated except that the water treatment was conducted at a temperature of 55° C. for 4 hours.

$W_0$ was 9.0 ppm and $W_1$ was 6.2 ppm and accordingly $W_0$-$W_1$ was 2.8 ppm.

EXAMPLE 37

Example 35 was repeated except that the water treatment was conducted at a temperature of 55° C. for 2 hours.

$W_0$ was 10.2 ppm and $W_1$ was 6.5 ppm and accordingly $W_0$-$W_1$ was 3.7 ppm.

EXAMPLE 38

Example 35 was repeated except that particulate polyethylene terephthalate having an intrinsic viscosity of 0.78 dl/g, a density of 1.40 g/cm$^3$ and the acetaldehyde content of 0.6 ppm was used instead.

$W_0$ was 7.5 ppm and $W_1$ was 6.0 ppm and accordingly $W_0$-$W_1$ was 1.5 ppm.

EXAMPLE 39

A stainless steel container was charged with 5 kg of the same polyethylene terephthalate as used in Example 35, and water vapor of 100° C. was passed therethrough at a rate of 0.5 kg/hr for 2 hours.

The polyethylene terephthalate thus treated was dried and then molded into a square plate as in Example 35.

$W_0$ was 10.0 ppm and $W_1$ was 6.5 ppm and accordingly $W_0$-$W_1$ was 3.5 ppm.

EXAMPLE 40

The particulate polyethylene terephthalate as used in Example 35 was kept in an atmosphere of relative humidity of 90% at a temperature of 40° C. for 7 days.

The polyethylene terephthalate thus treated was dried and molded into a square plate as in Example 35.

$W_0$ was 8.6 ppm and $W_1$ and 6.0 ppm and accordingly $W_0$-$W_1$ was 2.6 ppm.

COMPARATIVE EXAMPLE 16

The particulate polyethylene terephthalate used in Example 35 without subjecting to hot water treatment was molded at a cylinder temperature of 290° C. into a square plate. The acetaldehyde content of the square plate was 15 ppm. This value is taken as $W_0$.

The particulate polyethylene terephthalate was subjected at the temperature of 95° C. for 8 hours to hot water treatment, dehydrated and dried, and then molded at a cylinder temperature of 290° C. into a square plate. The acetaldehyde content of the square plate was 6.5 ppm. This value is taken as $W_1$.

$W_0$-$W_1$ was 8.5 ppm.

COMPARATIVE EXAMPLE 17

Comparative Example 16 was repeated except that particulate polyethylene terephthalate having an intrinsic viscosity of 0.78 dl/g, a density of 1.40 g/cm$^3$ and the acetaldehyde content of 0.6 ppm was used instead.

$W_0$ was 14.2 ppm and $W_1$ was 6.0 ppm and accordingly $W_0$-$W_1$ was 8.2 ppm.

COMPARATIVE EXAMPLE 18

Comparative Example 16 was repeated except that particulate polyethylene terephthalate having an intrinsic viscosity of 0.82 dl/g, a density of 1.40 g/cm$^3$ and the acetaldehyde content of 0.8 ppm was used instead.

$W_0$ was 14.0 ppm and $W_1$ was 7.0 ppm and accordingly $W_0$-$W_1$ was 7.0 ppm.

What is claimed is:

1. In polyethylene terephthalate, the improvement which resides in that the polyethylene terephthalate has an intrinsic viscosity of at least 0.54 dl/g, a density of more than 1.38 g/cm$^3$, and an oligomer content of less than 0.50% by weight, and that when the polyethylene terephthalate is subjected to solid phase polycondensation treatment by heating at a temperature of 215° C. in an inert atmosphere, a rate of polymerization is less than 0.004 dl/g·hr.

2. In polyethylene terephthalate, the improvement which resides in that the polyethylene terephthalate has an intrinsic viscosity of at least 0.54 dl/g, a density of more than 1.38 g/cm$^3$, and an oligomer content of less than 0.50% by weight, and that when the polyethylene terephthalate is injection molded at a cylinder temperature of 290° C. into a stepped square plate, the oligomer content of the stepped square plate is $$Y \leq -0.20X + 0.16$$

wherein Y is an increased amount (wt %) of the oligomer contained in the stepped square plate, and X is the oligomer content (wt %) of the polyethylene terephthalate before the molding thereof.

3. In polyethylene terephthalate, the improvement which resides in that the polyethylene terephthalate has an intrinsic viscosity of at least 0.54 dl/g, a density of more than 1.38 g/cm$^3$, and an oligomer content of less than 0.50% by weight, and that when the polyethylene terephthalate is subjected to solid phase polycondensation treatment by heating at a temperature of 215° C. in an inert atmosphere, a rate of solid phase polycondensation as determined is taken as $V_0$ and, on one hand, when the polyethylene terephthalate, which has been immersed in hot water kept at 95° C. for 8 hours and dried, is subjected to the above-mentioned solid phase polycondensation, a rate of solid phase polycondensation as determined is taken as $V_1$, the polymerization ratio $V_1/V_0$ is 0.1–1.0.

4. In polyethylene terephthalate, the improvement which resides in that the polyethylene terephthalate has an intrinsic viscosity of at least 0.54 dl/g, a density of more than 1.38 g/cm$^3$, and an oligomer content of less than 0.50% by weight, and that when the oligomer content of an article obtained by injection molding the polyethylene terephthalate at a molding temperature of 290° C. is taken as $W_0$ (wt %) and, on one hand, when the oligomer content of an article obtained by injection molding likewise the polyethylene terephthalate which has been immersed in hot water kept at 95° C. for 8 hours and dried is taken as $W_1$ (wt %), $W_0-W_1$ is 0–0.12% by weight.

* * * * *